United States Patent Office

3,640,890
Patented Feb. 8, 1972

3,640,890
LITHIA SILICA GLASS LASER CONTAINING
VARIOUS OTHER ALKALI OXIDES
Haynes A. Lee, Jr., Sylvania, and Charles F. Rapp,
Toledo, Ohio, assignors to Owens-Illinois, Inc.
No Drawing. Continuation-in-part of application Ser. No.
595,000, Nov. 15, 1966. This application June 6, 1969,
Ser. No. 831,256
The portion of the term of the patent subsequent to
Oct. 7, 1986, has been disclaimed
Int. Cl. C09k 1/54; H01s 3/16
U.S. Cl. 252—301.4                                   12 Claims

ABSTRACT OF THE DISCLOSURE

Glass lasers made from glasses containing the following ingredients in mole percent:

| Ingredient: | Mole percent |
|---|---|
| $SiO_2$ | 45 to 75 |
| $Al_2O_3$ | 0 to 10 |
| $Li_2O$ | 18 to 35 | and wherein at least one additional alkali metal oxide selected from the group consisting of $Na_2O$, $K_2O$, $Rb_2O$, $Cs_2O$ and mixtures is present in an amount of from 0.5 to 10 mole percent. Alkaline earth oxides such as BeO, MgO, SrO, BaO, CaO and mixtures thereof may also be present. Neodymium oxide is the laseable substance incorporated into the glasses. The glass lasers exhibit improved efficiency and have longer decay times and accommodate larger concentrations of neodymium than were present heretofore.

---

The present application is a continuation-in-part of application Ser. No. 595,000 filed Nov. 15, 1966, now U.S. Pat. 3,471,409.

The present invention relates to glass lasers and the method of making laseable glasses which possess particularly desirable properties and have improved efficiency characteristics.

A laser is a device capable of amplifying or generating coherent light. Lasers generate monochromatic optical radiation in the form of a narrowly plane wave with a beam angle diversion theoretically limited by diffraction effects. When a material exhibits such emission of radiation under a particular set of conditions, it is said to "lase" or to be "laseable."

The laser body itself can be in a variety of configurations. For example, it may be in the form of a small cylinder or rod, the end faces of which are plane and which have an extremely high degree of parallel accuracy. In addition, the end faces may be cut so as to be totally internally reflecting or cut to a Brewster angle to decrease the reflection loss. Various other modifications in the laser body itself can be made with laser compositions of the present invention. To further illustrate, one end of the rod can be completely reflecting and the other end faces may be partially reflecting.

In operation, the glass laser is subjected to excitation energy by any suitable means, Most commonly, a flash lamp is used operating for a few milliseconds at a time with an input energy which is normally rated at about 100 Joules. Of course, this input of energy can be varied.

In many instances involving actual operation of the laser, most of the input energy is dissipated by heat and only a relatively small portion of the energy furnished by the source of radiation is absorbed by the laser materials. Nevertheless, this is a high concentration of energy and it provides the excitation for the laser. The energy is absorbed by the laser over a broad spectral region and the laser funnels the energy into a narrow emission line whose wavelength is a function of the laseable substance contained in the laser host.

In the field of high power pulsed lasers, although it is important that the laser material be efficient from the standpoint of power output compared to power input, the efficiency of glass laser compositions has not been as high as desired. Further, in high power pulsed laser applications, the problem of solarization has limited the use of some glass laser compositions.

It is therefore an object of the present invention to provide glass lasers having relatively high efficiency for high energy applications.

It is a further object of the present invention to provide glass lasers having relatively high efficiency and resistance to solarization.

In attaining the above objects, one feature of the present invention resides in a glass laser based on the lithiasilica system which further contains at least one additional alkali metal oxide selected from the group consisting of $Na_2O$, $K_2O$, $Rb_2O$, $Cs_2O$ and mixtures thereof. Further, the glass may contain $Al_2O_3$ and/or an alkaline earth oxide.

A further feature of the present invention resides in glass lasers comprising the following ingredients in mole percent:

| Component: | Mole percent |
|---|---|
| $SiO_2$ | 45 to 75 |
| $Al_2O_3$ | 0 to 10 |
| $Li_2O$ | 18 to 35 |
| $R_2O$ (alkali metal oxide) | 0.5 to 10 | wherein the laseable material is neodymium oxide which is present in an amount of 0.1 to 2 mole percent.

A further feature of the present invention resides in employing as the host material a glass having the following composition:

| Component: | Mole percent |
|---|---|
| $SiO_2$ | 50 to 60 |
| $Al_2O_3$ | 2 to 10 |
| $Li_2O$ | 20 to 30 |
| $R_2O$ (alkali metal oxide) | 0.5 to 10 |
| RO (alkaline earth metal oxide) | 0.5 to 30 |

The above as well as other objects and features of the invention will become apparent from the following detailed description thereof.

In carrying out the present invention, glass compositions selected from the silica-lithia and the silica-alumina-lithia systems are employed containing the following ingredients in mole percent based on the total composition:

| Component: | Mole percent |
|---|---|
| $SiO_2$ | 45 to 75 |
| $Al_2O_3$ | 0 to 10 |
| $Li_2O$ | 18 to 35 |
| $R_2O$ | 0.5 to 10 | wherein $R_2O$ can be $Na_2O$, $K_2O$, $Rb_2O$ or $Cs_2O$.

In a more particular embodiment of this invention the alumina is present in an amount of 2 to 5 and the amount of alkaline earth metal oxide (RO) is present in an amount of 10 to 20 mole percent.

The laseable substance that is dispersed in the glass composition is neodymium oxide, $Nd_2O_3$. The quantity of neodymium oxide incorporated into the laser host varies and generally will be in the range of 0.1 to 2 mole percent although these amounts are not critical and can be varied.

As a further embodiment of the present invention, the glass lasers contained in addition to the above components from 0.5 to 30 mole percent of an alkaline earth metal oxide selected from the group consisting of BeO, MgO, SrO, CaO and mixtures thereof.

In a still further embodiment of the invention, the glass lasers may include up to about 2 mole percent of ingredients such as ZnO, CdO, PbO, $La_2O_3$.

Generally, it is preferred to have at least 0.1 mole percent of neodymium oxide in the composition, the optimum amount being usually from about 0.1 to 0.8 or 1.0 mole percent.

In addition to the foregoing ingredients it is preferred to include in the glass composition an amount of solarization inhibiting oxide, $CeO_2$, from about 0.1 to 0.5 or more mole percent.

In general the raw materials are melted to form a glass which is then cooled and annealed. Thereafter, the rods, cylinders, tubes, etc. are cut from the glass. Suitable melting temperatures are in the range of 2500° F. while representative annealing conditions are 950° F. for 3 hours.

The following examples are intended to illustrate the present invention:

EXAMPLES 1 TO 4

Four melts were prepared by mixing reagent grade raw materials to form glass melts of high optical quality having the following compositions in mole percent:

| Ingredients | 1 | 2 | 3 | 4 |
|---|---|---|---|---|
| $SiO_2$ | 60 | 60 | 50 | 55 |
| $Al_2O_3$ | 2.5 | 2.5 | 2.5 | 2.5 |
| $Li_2O$ | 20 | 20 | 20 | 27.5 |
| $Na_2O$ | 7.5 | | | |
| $K_2O$ | | 7.5 | 7.5 | 5 |
| CaO | 10 | 10 | 20 | 10 |
| $CeO$ | 0.16 | 0.16 | 0.16 | 0.16 |
| $Nd_2O_3$ | 0.5 | 0.5 | 0.5 | 0.5 |

Laser rods were made from each of these compositions and demonstrated satisfactory properties. The rods were about ½ inch in diameter and 4 inches in length. The ends of the rods were polished to a close tolerance. The rods were placed in a cylindrical cavity with a highly polished aluminum interior surface. A PEK XE5-2153-2 helical Xenon flashlamp was used. The energy to the lamp was supplied from power supply containing capacitors that are chargeable to produce a constant capacitance, the power supply being a Lear Siegler, Inc. Energy Storage Unit and Control Power Unit.

What is claimed is:

1. A glass laser composition comprising the following ingredients in mole percentages:

| Ingredient: | Mole percent |
|---|---|
| $SiO_2$ | 45 to 75 |
| $Li_2O$ | 18 to 35 |
| $R_2O$ | 0.5 to 10 |
| $Nd_2O_3$ | 0.1 to 2 |
| $Al_2O_3$ | 0 to 10 | wherein $R_2O$ is a member selected from the group consisting of $Na_2O$, $K_2O$, $Rb_2O$, $Cs_2O$ and mixtures thereof.

2. A glass laser composition as defined in claim 1 in which the following ingredients are present in mole percent:

| Ingredient: | Mole percent |
|---|---|
| $SiO_2$ | 50–60 |
| $Li_2O$ | 20–30 |
| $R_2O$ | 2–10 |
| $Nd_2O_3$ | 0.1–2 |
| $Al_2O_3$ | 2–10 |

3. A glass laser composition as defined in claim 1 in which the following ingredients are present in mole percent:

| Ingredient: | Mole percent |
|---|---|
| $SiO_2$ | 50–60 |
| $Li_2O$ | 20–30 |
| $R_2O$ | 2–10 |
| $Nd_2O_3$ | 0.1–1 |
| $Al_2O_3$ | 2–5 |

4. A composition as defined in claim 1 containing a small but effective amount of $CeO_2$.

5. A glass laser composition as defined in claim 4 in which the following ingredients are present in mole percent:

| Ingredient: | Mole percent |
|---|---|
| $SiO_2$ | 45–75 |
| $Li_2O$ | 18–35 |
| $R_2O$ | 0.5–10 |
| $Nd_2O_3$ | 0.1–2 |
| $CeO_2$ | 0.1–0.5 |
| $Al_2O_3$ | 0–8 |

6. A glass laser as defined in claim 1 wherein the base glass has the following composition:

| Ingredient: | Mole percent |
|---|---|
| $SiO_2$ | 60 |
| $Al_2O_3$ | 2.5 |
| $Li_2O$ | 20 |
| $Na_2O$ | 7.5 |
| CaO | 10 | and wherein the following are additionally present in the indicated amounts in mole percent based on 100 mole percent of the base glass composition:

| $Nd_2O_3$ | 0.5 |
|---|---|
| $CeO_2$ | 0.16 |

7. A glass laser as defined in claim 1 wherein the base glass has the following composition:

| Ingredient: | Mole percent |
|---|---|
| $SiO_2$ | 60 |
| $Al_2O_3$ | 2.5 |
| $Li_2O$ | 20 |
| $K_2O$ | 7.5 |
| CaO | 10 | and wherein the following are additionally present in the indicated amounts in mole percent based on 100 mole percent of the base glass composition:

| $Nd_2O_3$ | 0.5 |
|---|---|
| $CeO_2$ | 0.16 |

8. A glass laser as defined in claim 1 wherein the base glass has the following composition:

| Ingredient: | Mole percent |
|---|---|
| $SiO_2$ | 50 |
| $Al_2O_3$ | 2.5 |
| $Li_2O$ | 20 |
| $K_2O$ | 7.5 |
| CaO | 20 | and wherein the following are additionally present in the indicated amounts in mole percent based on 100 mole percent of the base glass composition:

| $Nd_2O_3$ | 0.5 |
|---|---|
| $CeO_2$ | 0.16 |

9. A glass laser as defined in claim 1 wherein the base glass has the following composition:

| Ingredient: | Mole percent |
|---|---|
| $SiO_2$ | 55 |
| $Al_2O_3$ | 2.5 |
| $Li_2O$ | 27.5 |
| $K_2O$ | 5 |
| CaO | 10 | and wherein the following are additionally present in the indicated amounts in mole percent based on 100 mole percent of the base glass composition:

CeO$_2$ ---------------------------------- 0.16
Nd$_2$O$_3$ ------------------------------ 0.5

10. A glass laser component comprising a glass rod of the composition defined in claim 1.

11. A glass laser component comprising a glass rod of the composition defined in claim 4.

12. A method of making a relatively low solarization, high efficiency glass laser component comprising the steps of:

(1) preparing a glass melt corresponding to the following composition in mole percentages:

| Ingredient: | Mole percent |
|---|---|
| SiO$_2$ | 45 to 75 |
| Li$_2$O | 18 to 35 |
| R$_2$O | 0.5 to 10 |
| Nd$_2$O$_3$ | 0.1 to 2 |
| CeO$_2$ | 0.1 to 0.5 |
| Al$_2$O$_3$ | 0 to 8 | wherein R$_2$O is a member selected from the group consisting of Na$_2$O, K$_2$O, Rb$_2$O, Cs$_2$O and mixtures thereof, cooling and annealing said glass melt and (2) forming a shaped glass body from the melt to obtain the relatively high efficiency glass laser component.

References Cited
UNITED STATES PATENTS 3,422,025  1/1969  Snitzer et al. ____ 252—301.4 IV
3,471,408  10/1969 Young _____ 252—301.4 IV
3,471,409  10/1969 Lee, Jr. et al. ____ 252—301.4 IV ROBERT D. EDMONDS, Primary Examiner U.S. Cl. X.R.

106—52; 330—4.3; 331—94.5